US006842304B2

(12) United States Patent
Chliwnyj et al.

(10) Patent No.: US 6,842,304 B2
(45) Date of Patent: Jan. 11, 2005

(54) MEASUREMENT OF WRITE TRACK WIDTH FOR MAGNETIC TAPE HEAD

(75) Inventors: Alex Chliwnyj, Tucson, AZ (US); Christopher Robert Pandolfo, Cambridge, MA (US); David Lee Swanson, Tucson, AZ (US); Steven Carter Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 10/337,722

(22) Filed: Jan. 8, 2003

(65) Prior Publication Data

US 2004/0130818 A1 Jul. 8, 2004

(51) Int. Cl.[7] .............................................. G11B 15/18
(52) U.S. Cl. .................................. 360/72.1; 360/261.1
(58) Field of Search ............................. 360/72.1, 261.1, 360/90, 77.12, 126, 317; 324/210; 216/22

(56) References Cited

U.S. PATENT DOCUMENTS

| | | | | |
|---|---|---|---|---|
| 4,827,359 A | | 5/1989 | Ookawa et al. ............ 360/10.3 |
| 5,621,595 A | * | 4/1997 | Cohen ........................ 360/126 |
| 5,673,163 A | * | 9/1997 | Cohen ........................ 360/126 |
| 5,745,980 A | * | 5/1998 | Cohen ..................... 29/603.14 |
| 5,888,411 A | * | 3/1999 | Cohen ......................... 216/22 |
| 5,945,007 A | * | 8/1999 | Cohen ......................... 216/22 |
| 6,081,408 A | * | 6/2000 | Partee ........................ 360/317 |
| 6,391,212 B1 | * | 5/2002 | Cohen ......................... 216/22 |
| 6,608,477 B2 | * | 8/2003 | Sacks et al. ................ 324/210 |
| 6,661,600 B1 | * | 12/2003 | Chliwnyj et al. ......... 360/77.12 |
| 6,665,144 B2 | * | 12/2003 | Matono ...................... 360/126 |
| 6,674,603 B2 | * | 1/2004 | Basham et al. .......... 360/77.12 |
| 6,680,609 B1 | * | 1/2004 | Fang et al. ................ 324/210 |

FOREIGN PATENT DOCUMENTS

| | | | |
|---|---|---|---|
| JP | 01-201817 | 8/1989 | ........... G11B/5/455 |
| JP | 11-195201 | 7/1999 | ............ G11B/5/00 |
| JP | 2001-291217 | 10/2001 | ........... G11B/5/455 |

* cited by examiner

*Primary Examiner*—Sinh Tran
*Assistant Examiner*—Fred Tzeng
(74) *Attorney, Agent, or Firm*—John H. Holcombe

(57) ABSTRACT

Width of a write track for a magnetic tape head is measured by writing a foreground magnetic track signal on a magnetic tape having a dissimilar background signal. A magnetic tape read head is moved from beyond one edge, laterally across, and beyond the opposite edge of the foreground track signal. Logic detects the read head encountering the one edge and the opposite edge of the foreground track signal; and determines, from an independent position sensor, the width of the foreground track signal as the lateral distance between the lateral position of the read head at one edge, and at the opposite edge of the foreground track signal.

20 Claims, 10 Drawing Sheets

MEASUREMENT OF WRITE TRACK WIDTH FOR MAGNETIC TAPE HEAD

DOCUMENTS INCORPORATED BY REFERENCE

Commonly assigned U.S. Pat. No. 5,946,159 is incorporated for its showing of a track following servo system for following servo track edges of dissimilar servo signals, and employing a non-servo, or independent, position sensor. Commonly assigned U.S. patent application Ser. No. 10/035,182, filed Jan. 4, 2002, is incorporated for its showing of defined signal injection to a servo system to calibrate servo positions employing an independent position sensor.

FIELD OF THE INVENTION

This invention relates to magnetic tape systems for storing data on magnetic tape, and, more particularly, to determining the width of a write track for a magnetic tape head, where multiple parallel tracks are written to a magnetic tape.

BACKGROUND OF THE INVENTION

Magnetic tape systems provide convenient and low cost means for storing data. As one example, portable magnetic tape cartridges may be carried from a data storage drive of one data processing system to a storage facility, and, if needed, they may be carried to a data storage drive of the same or another data processing system. As another example, large quantities of magnetic tape cartridges may be stored in storage shelves of an automated data storage library and accessed from the storage shelves as needed to access the data.

There is a continuing desire to increase the data storage capacity of magnetic tape. One means of increasing data storage capacity is to increase the number of parallel tracks of data. However, as the number of parallel tracks are increased, the track widths, and margin for error between adjacent tracks, are correspondingly decreased. For example, magnetic tape systems have track patterns (spacing between adjacent track centerlines) ⅓ the width of older magnetic tape systems, meaning that the tracks are written narrower and that there is now little or no allowance for spacing between the adjacent tracks. Without spacing between the tracks, the tracks may be "shingled" in which a more recently written track whose width is greater than the spacing between the adjacent track centerlines partially overwrites one edge of the adjacent written track. As the result, the actual track width of that adjacent written track is now less than when it was written, and the centerline of that track has moved. Alternatively, the written track width may be too narrow for a read head, and the read head will read too much noise from between the tracks. Still alternatively, the written track width may be too wide, such that a written track overwrites too much of the adjacent track (more than shingling) such that the overwritten track cannot be read.

Tape heads are typically manufactured in thin film processes and have multiple write gaps and multiple read gaps. The write gaps (read gaps also) tend to vary slightly in width between tape heads, and, due to various edge or fringing effects, the write gaps tend to have effective widths that vary between tape heads. In many cases, the effective widths are about the same within a tape head, even though there may be variation between tape heads. To determine the width of the tape head write gap, the tape head is operated to write a track on a test tape, a magnetic fluid is placed on the test tape, and the test tape is read by an operator with a microscope to estimate the track width. A potential error situation can result, in that the operator must estimate where the actual magnetic edge is from the magnetic particles in the magnetic fluid.

The resultant estimated track width is then provided with the tape head, and, after the tape drive is assembled, the estimated track width is entered into a data base of a servo system of the tape drive in which the tape head is mounted. Additional sources for potential error comprise insuring that the correct data is provided for each head, and the head may have more or less skew than when in the tester, making the effective track width different.

Measurement of the width of a head having an unknown width has apparently been attempted by measuring against a recorded pattern of known width. In one example, Japanese patent JP200129127A appears to measure the time for a helical scan device to cross a longitudinal test track to estimate the head width, and in another example, Japanese patent JP120817A appears to measure the time for a floppy disk head to cross a helical test track to estimate the head width. The process is unworkable to measure a longitudinal track with a longitudinal recording system.

SUMMARY OF THE INVENTION

A system, method, and computer program product, in accordance with aspects of the present invention, determining the width of a foreground magnetic track signal written longitudinally on a magnetic tape having a background signal, the foreground magnetic track signal comprising a signal dissimilar to the background signal. The foreground magnetic track signal may be written by the write gap that is being tested.

In one embodiment, the system comprises a magnetic tape read head; and a servo system for moving a magnetic tape read head laterally with respect to the longitudinally written foreground magnetic track signal. The magnetic tape read head may thus read the foreground magnetic track signal and may read the background signal. The lateral movement is such that the magnetic tape read head is moved at least once entirely laterally to one side of and off of one edge of the foreground magnetic track signal, laterally across the foreground magnetic track signal, and entirely laterally to the opposite side of and off of the opposite edge of the foreground magnetic track signal, whereby the magnetic tape read head reads the dissimilar signals.

An independent position sensor detects lateral positions of the moving magnetic tape read head; and logic, which may be a computer implemented program product, is provided for receiving detected signals from the magnetic read head, and from the independent position sensor. The logic detects the magnetic read head encountering the one edge of the foreground magnetic track signal; determines, from the independent position sensor, the lateral position of the moving magnetic tape read head at the detected one edge of the foreground magnetic track signal; detects the magnetic tape read head encountering the opposite edge of the foreground magnetic track signal; and determines, from the independent position sensor, the lateral position of the moving magnetic tape read head at the detected opposite edge of the foreground magnetic track signal.

The logic determines the width of the foreground magnetic track signal as the lateral distance between the determined lateral position of the moving magnetic tape read head at the detected one edge of the foreground magnetic track signal, and the determined lateral position of the moving magnetic tape read head at the detected opposite edge of the foreground magnetic track signal.

In another embodiment, the logic, in detecting the magnetic tape read head encountering the one edge, and encountering the opposite edge, of the foreground magnetic track signal, each comprises measuring a ratio between the foreground magnetic track signal and the background signal. The ratios when the magnetic tape read head is moved entirely laterally to one side of and off of the one edge of the foreground magnetic track signal, and moved entirely laterally to the opposite side of and off of the opposite edge of the foreground magnetic track signal, each indicates a minimum value of the foreground magnetic track signal.

In a further embodiment, the logic, in detecting the magnetic tape read head encountering the one edge, and encountering the opposite edge, of the foreground magnetic track signal, additionally each comprises detecting an inflection in the measured ratio between the foreground magnetic track signal and the background signal.

In still another embodiment, wherein the magnetic tape read head comprises a servo read head of the servo system, and the magnetic tape additionally comprises at least one servo track parallel to and laterally offset from the foreground magnetic track signal, the servo system additionally moves the magnetic tape read head laterally from the servo track to the foreground magnetic track signal, as measured by the independent position sensor.

In a still further embodiment, the magnetic tape read head that is used to measure the track width is wider than the width of the foreground magnetic track signal, such that the background signal may be read by the magnetic tape read head during each stage of laterally moving the magnetic tape read head, entirely laterally to the one side of and off of the one edge of the foreground magnetic track signal, laterally across the foreground magnetic track signal, and entirely laterally to the opposite side of and off of the opposite edge of the foreground magnetic track signal. The read head in this instance would not be the normal read head for reading information from the track because the normal read head must never be wider than the written pattern, as is known to those of skill in the art.

In another aspect, the logic additionally determines from the determined lateral distance, whether the determined lateral distance is greater than a nominal distance between centerlines of magnetic track signals; and if so, provides a setting for the servo system for controlling the centerlines of a magnetic tape drive which will write magnetic tracks at the width of the foreground magnetic track signal to accommodate shingling between the magnetic tracks at the width; else, provides the servo system setting for controlling the centerlines of the magnetic tape drive at the nominal distance.

In still another aspect, the servo system moves the magnetic tape read head laterally with respect to the longitudinally written foreground magnetic track signal, additionally operating at set points which are altered at a predetermined sinusoidal single frequency pattern, the pattern additionally such that the magnetic tape read head is moved at least once entirely laterally to one side of and off of one edge of the foreground magnetic track signal, laterally across the foreground magnetic track signal, and entirely laterally to the opposite side of and off of the opposite edge of the foreground magnetic track signal. The logic additionally:

converts digitally determined the lateral positions detected by the independent position sensor to frequency components;

selects from the frequency components of the lateral positions, the predetermined sinusoidal single frequency pattern;

converts the lateral position frequency components to independent position sensor lateral positions;

measures digitally determined ratios between the foreground magnetic track signal and the background signal from the magnetic tape read head;

converts the digitally determined ratios to frequency components;

selects from the frequency components of the ratios, the predetermined sinusoidal single frequency pattern;

converts the ratio frequency components to ratios of the foreground magnetic track signal and the background signal; and cancels the predetermined sinusoidal single frequency pattern and fits a curve to the converted independent position sensor lateral positions and to the converted ratios of the foreground magnetic track signal and the background signal.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
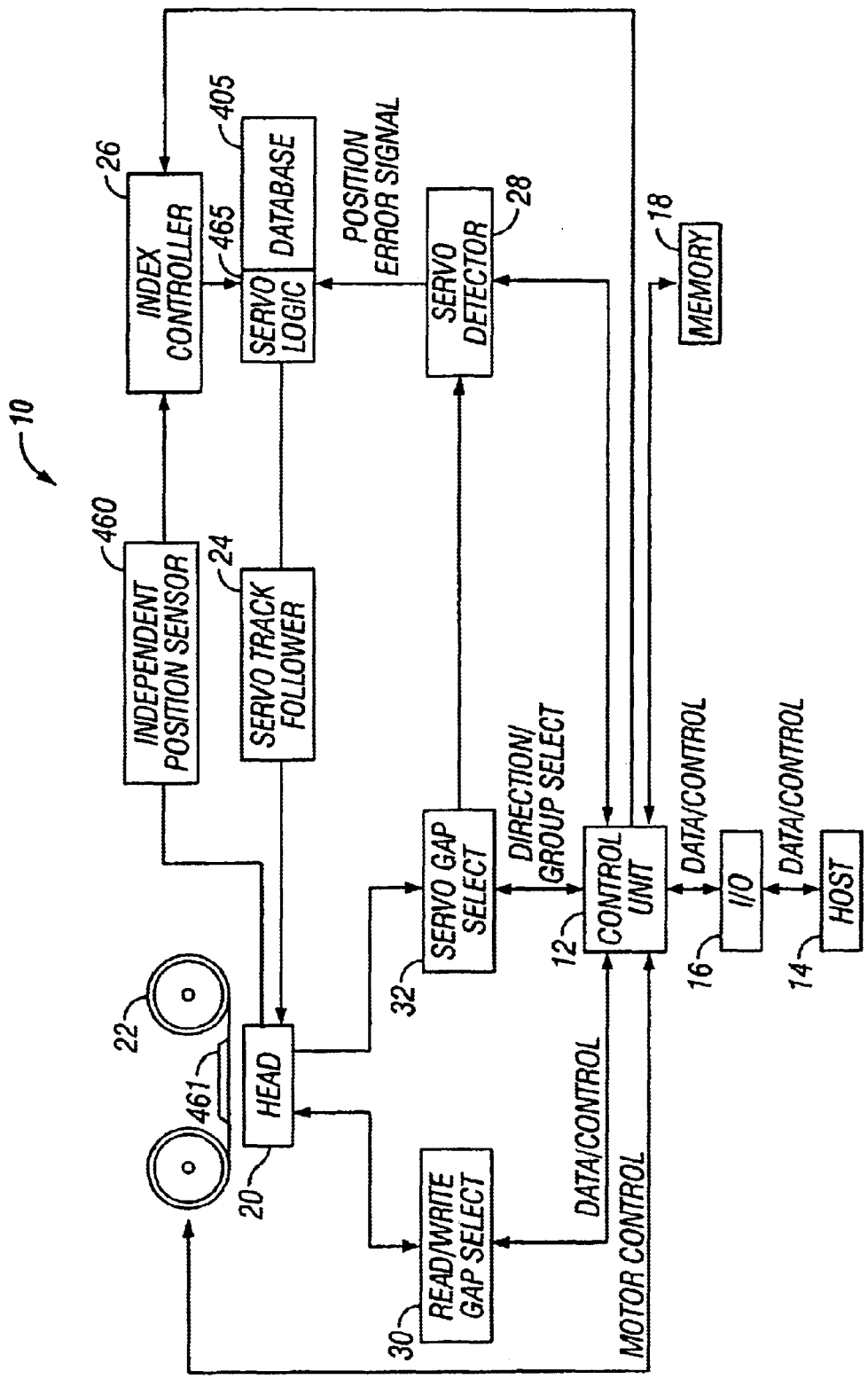
FIG. 1 is a block diagram of an embodiment of a magnetic tape system which implements the present invention.

Referring to FIG. 1, a magnetic tape system 10 is illustrated. One example of a magnetic tape system in which the present invention may be employed is a magnetic tape test system. Another example of a magnetic tape system in which the present invention may be employed is a magnetic tape data storage subsystem, such as the IBM 3590 magnetic tape subsystem. A control unit 12 is provided which receives and transmits data and control signals to and from a host device 14 via an interface 16. The control unit 12 may comprise a computer processor and is coupled to a memory device 18, such as a random access memory for storing information and computer programs. An example of a host device 14 comprises an IBM RS/6000 processor.

A multi-element tape head 20, such as is well known in the art, includes a plurality of data write gaps and data read gaps to record and read data onto and from a magnetic tape 22, and servo sensors or read elements to read servo signals comprising prerecorded linear servo edges on the magnetic tape 22. Data tracks on a recorded magnetic tape are typically arranged in parallel and are parallel to the linear servo edges. A servo track follower 24 is operated by servo logic 465 in response to a servo detector 28 to track follow a linear servo edge or a servo index position laterally offset from a servo edge, as sensed by servo sensors of the magnetic tape head 20. The data write gaps and the data read gaps, mounted on the same tape head, thus track a parallel group of the data tracks. The logic 465 may comprise a programmed PROM, ASIC or microprocessor.

As discussed above, magnetic tape heads, such as tape head 20, are typically manufactured in thin film processes and have multiple write gaps and multiple read gaps. The write gaps (read gaps also) tend to vary slightly in width between tape heads, and, due to various edge or fringing effects, the write gaps tend to have effective widths that vary between tape heads. The variations in width may result in "shingling" of the written tracks such that the centerlines change, may result in the written tracks being too narrow to read without noise, or may result in written tracks that overwrite too much of the adjacent track. In many cases, the effective widths are about the same within a tape head, even though there may be variation between tape heads.

The magnetic tape system of FIG. 1 is employed in accordance with embodiments of the present invention for measuring the effective width of a magnetic tape write gap or gaps, by determining the width of a foreground magnetic track signal written longitudinally on a magnetic tape having a background signal, the foreground magnetic track signal comprising a signal dissimilar to the background signal. The invention may be implemented in the hardware and logic of the tape drive system, may comprise a method, or may comprise a computer program product usable with a programmable computer having computer readable program code embodied therein, the computer program product comprising computer readable program code which operates a computer processor. The computer program product may be provided in a fixed or removable memory, such as memory device 18, which may comprise a ROM, PROM, disk drive or diskette, associated with the control unit 12, may be stored as a part of a database 405 of servo logic 465, or may be supplied externally, e.g., from host device 14, all as known to those of skill in the art.

In the magnetic tape system of FIG. 1, a tape reel motor system (not shown) moves the tape 22 in the longitudinal direction while it is supported at a tape path 461 for reading and writing. The tape path may, in one alternative, precisely guide the tape in position laterally. In another alternative, the tape path 461 does not precisely hold the tape in position laterally. Rather, open channel guiding is employed in which the magnetic tape can move laterally a distance which is substantially greater than a track width, thereby introducing substantial noise into the guiding process.

The servo track follower 24 directs the motion of the magnetic tape head 20 in a lateral or transverse direction relative to the longitudinal direction of tape motion. The control unit 12 is coupled to the tape reel motors and controls the direction, velocity and acceleration of the tape 22 in the longitudinal direction. If it is desired to track another parallel group of data tracks, the magnetic tape head 20 is indexed laterally to another servo edge or to another servo index position, or a different servo sensor is aligned with the same or a different servo edge or servo index position. The tape system 10 may be bidirectional, in which ones of the read/write gaps are selected for one direction of longitudinal tape movement, and others of the read/write gaps are selected for the opposite direction of movement. The control unit 12 additionally selects the appropriate ones of the read/write gaps by transmitting a signal to a read/write gap select unit 30. When the magnetic tape head 20 is to be moved to a selected index position, an index controller 26 is enabled by the control unit 12, and receives a mechanical lateral position signal from an independent position sensor 460 and transmits an appropriate signal to the servo logic 465 to select the appropriate servo track, while the control unit 12 transmits an appropriate signal to a servo gap selector 32 to select the appropriate servo sensor. The independent position sensor 460 is discussed in the incorporated U.S. Pat. No. 5,946,159, where it is called a non-servo position sensor, and indicates the lateral mechanical position of the tape head 20 with respect to the tape path 461. In accordance with the present invention, the independent position sensor 460 accurately tracks the lateral mechanical position of the tape head 20 with respect to the magnetic tape 22. Once a servo edge or edges are selected, the servo gap selector 32 provides the servo signals to a servo detector 28, which information is employed by servo logic 465 to position the tape head 20 to track follow the detected edges.

Figure 2:
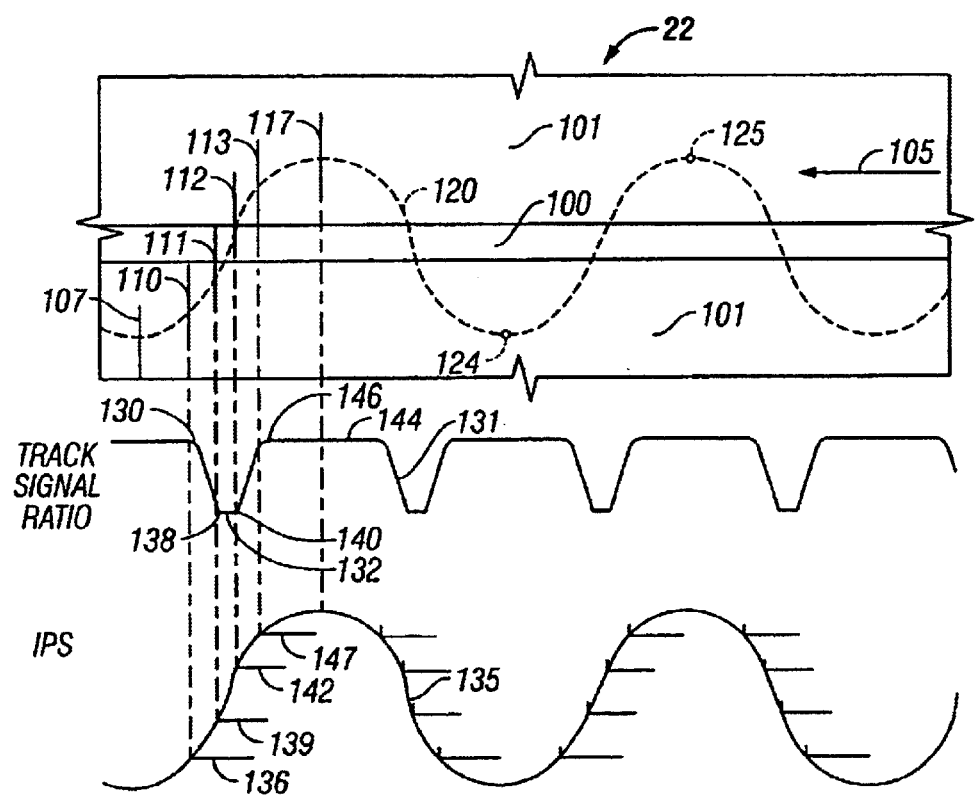
FIG. 2 is a diagrammatic representation of a length of magnetic tape with a foreground magnetic track signal written longitudinally on the magnetic tape having a background signal, showing movement of a read head laterally with respect to the track signal, the detected foreground signals or ratios of the foreground signal to background signal detected by the read head, and the signal of an independent position sensor, all of the magnetic tape system of FIG. 1.

Referring to FIG. 2, the present invention employs a magnetic tape system, such as magnetic tape system 10 of FIG. 1, to measure the effective width of a magnetic tape write head gap or gaps, by determining the width of a foreground magnetic track signal 100 of FIG. 2, written longitudinally by the write gap being measured on a magnetic tape 22 having a background signal 101, the foreground magnetic track signal comprising a signal dissimilar to the background signal.

In one embodiment, the servo system 28, 465, 24 of FIG. 1 moves a magnetic tape read head, such as a read gap or a servo read element of tape head 20, laterally with respect to the longitudinally written foreground magnetic track signal 100 of FIG. 2 as the magnetic tape is moved longitudinally in the direction of arrow 105 with respect to the magnetic tape read head. Thus, the magnetic tape read head. 107 may read the foreground magnetic track signal 100 and may read the background signal 101, depending on the lateral position of the magnetic tape read head.

The lateral movement is such that the magnetic tape read head 107 is moved at least once entirely laterally to one side of and off of one edge of the foreground magnetic track signal 100, as shown by position 107, laterally across the foreground magnetic track signal, as shown by positions 110, 111, 112, 113, and entirely laterally to the opposite side of and off of the opposite edge of the foreground magnetic track signal 100, as shown by position 117, and the magnetic tape read head reads the dissimilar signals from the background signal 101 and the foreground signal 100. The pattern may be repeated several times as shown by dotted line 120, which represents the position of the center of the magnetic tape read head.

In the example of FIG. 2, the lateral movement is in the form of a single sinusoid. However, any pattern of lateral movement may be employed in accordance with the present invention.

As the magnetic tape read head is moved laterally, the independent position sensor 460 of FIG. 1 detects the lateral positions of the moving magnetic tape read head, for example, as shown by dots 124, 125, of FIG. 2 representing lateral positions of the magnetic read head along the path 120 when to one side and to the opposite side of the foreground magnetic track signal 100.

Logic, which may be a computer implemented program product, such as implemented in control unit 12 or in servo logic 465 of FIG. 1, is provided for receiving detected signals from the magnetic read head 107, and from the independent position sensor 124 of FIG. 2.

In accordance with one aspect of the present invention, the logic detects the magnetic read head encountering the one edge of the foreground magnetic track signal, as shown by the head in position 110, where one edge of the head reaches the foreground magnetic track signal 100. In one embodiment, the foreground magnetic track signal 100 is first detected, and, in an alternative embodiment, the ratio of the background magnetic track signal 101 to the foreground signal 100 moves away from substantially a maximum value of the ratio, both shown by the inflection 130 of signal 131. The logic additionally determines, from the signal 135 of the independent position sensor 460 of FIG. 1, the lateral position 136 of FIG. 2 of the moving magnetic tape read head at the detected one edge 110 of the foreground magnetic track signal. In the illustrated embodiment of FIG. 2, the magnetic tape read head is shown as being wider than the width of the foreground magnetic track signal. In alternative embodiments, the magnetic tape read head may be less wide than, or substantially the same width as, the width of the foreground magnetic track signal. In the example where the magnetic tape read head is wider than the width of the foreground magnetic track signal, the read head is not the normal read for reading information from the track. As is known to those of skill in the art, a normal read head must never be wider than the written pattern. Hence, in the example, as discussed above, a servo read element of tape head 20 of FIG. 1 is moved laterally with respect to the foreground magnetic track signal 100 of FIG. 2.

The ratio between the foreground magnetic track signal and the background signal may be determined in a variety of ways, as are understood by those of skill in the art. In the illustration of FIG. 2, the ratio represents the ratio of the background signal divided by the foreground magnetic track signal. Alternative ratios may comprise a reverse ratio, ratios involving differences between the signal {e.g., $(S_1-S_2)/S_1$}, etc.

The detected track signal increases as the magnetic tape read head is moved laterally across the foreground magnetic track signal, reducing the detected ratio. As illustrated in FIG. 2, the detected track signal increases to a maximum, reducing the detected ratio to a minimum 132, as the magnetic tape read head moves from position 111 to position 112, the minimum ratio being related to the proportion of the head width constituted by the track width. In the alternative embodiments of a smaller magnetic tape read head, the minimum ratio becomes substantially zero, or a negative maximum.

In one embodiment, the logic detects the moving magnetic tape read head encountering the opposite edge 111 of the foreground magnetic track signal, as shown by the inflection point 138, and determines, from the independent position sensor, the lateral position 139 of the moving magnetic tape read head at the detected opposite edge of the foreground magnetic track signal.

The logic determines the width of the foreground magnetic track signal as the lateral distance between the determined lateral position 136 of the moving magnetic tape read head at the detected one edge of the foreground magnetic track signal, and the determined lateral position 139 of the moving magnetic tape read head at the detected opposite edge of the foreground magnetic track signal.

In one embodiment of the present invention, the logic then detects the reverse edge of the magnetic read head encountering the one edge of the foreground magnetic track signal 100, as shown by the head in position 112. In one embodiment, the foreground magnetic track signal 100 is at the inflection point 140 of the plateau 132 of the detected track signal 131, and, in an alternative embodiment, the ratio of the background magnetic track signal 101 to the foreground signal 100 moves back toward the maximum value. The logic additionally determines, from the signal 135 of the independent position sensor 460 of FIG. 1, the lateral position 142 of FIG. 2 of the moving magnetic tape read head at the detected one edge 112 of the foreground magnetic track signal.

The detected track signal decreases as the magnetic tape read head is moved laterally across the foreground magnetic track signal. As illustrated in FIG. 2, the detected track signal ratio increases to a maximum 144 as the magnetic tape read head moves from position 112 to position 113, the minimum foreground signal and maximum ratio being reached as the head moves entirely off of the foreground magnetic track signal 100.

In one embodiment, the logic detects the moving magnetic tape read head encountering the opposite edge 113 of the foreground magnetic track signal, as shown by the inflection point 146, and determines, from the independent position sensor, the lateral position 147 of the moving magnetic tape read head at the detected opposite edge of the foreground magnetic track signal.

The logic determines the width of the foreground magnetic track signal as the lateral distance between the determined lateral position 142 of the moving magnetic tape read head at the detected one edge of the foreground magnetic track signal, and the determined lateral position 147 of the moving magnetic tape read head at the detected opposite edge of the foreground magnetic track signal.

In an alternative embodiment, the logic detects the magnetic read head first encountering the one edge of the foreground magnetic track signal 100, as shown by the head in position 110, and the foreground magnetic track signal 100 is at the inflection point 130 of the detected track signal 131, and, in a further alternative embodiment, the ratio of the background magnetic track signal 101 to the foreground signal 100 becomes less than one. The logic additionally determines, from the signal 135 of the independent position sensor 460 of FIG. 1, the lateral position 136 of FIG. 2 of the moving magnetic tape read head at the detected one edge 110 of the foreground magnetic track signal.

The detected track signal ratio decreases, reaches a plateau 132, and increases as the magnetic tape read head is moved laterally across the foreground magnetic track signal. As illustrated in FIG. 2, the detected track signal increases to a maximum 144 as the magnetic tape read head moves to position 113, the minimum foreground signal and maximum ratio being reached as the head moves entirely off of the foreground magnetic track signal 100, in the alternative embodiment, the logic detecting the magnetic tape read head encountering the opposite edge 113 of the foreground magnetic track signal, as shown by the inflection point 146. The logic determines, from the independent position sensor, the lateral position 147 of the moving magnetic tape read head at the detected opposite edge of the foreground magnetic track signal.

The logic determines the width of the foreground magnetic track signal as the lateral distance between the determined lateral position 136 of the moving magnetic tape read head at the detected one edge of the foreground magnetic track signal, and the determined lateral position 147 of the moving magnetic tape read head at the detected opposite edge of the foreground magnetic track signal, subtracting the effective width of the magnetic read head 107.

As shown by the path 120 of the magnetic track read head 120, the track signal or ratio 131, and the signal 135 of the independent position sensor, the magnetic track read head may be moved back and forth entirely laterally to one side of and off of one edge of the foreground magnetic track signal 100, laterally across the foreground magnetic track signal, and entirely laterally to the opposite side of and off of the opposite edge of the foreground magnetic track signal 100, and the magnetic tape read head reads the dissimilar signals from the background signal 101 and the foreground signal 100, as the independent position sensor detects the lateral position of the magnetic track read head. The measurements of the width of the foreground magnetic track signal may then be averaged to provide a precise measurement of the effective width of the write gap of the head 20 of FIG. 1.

Figure 3A:
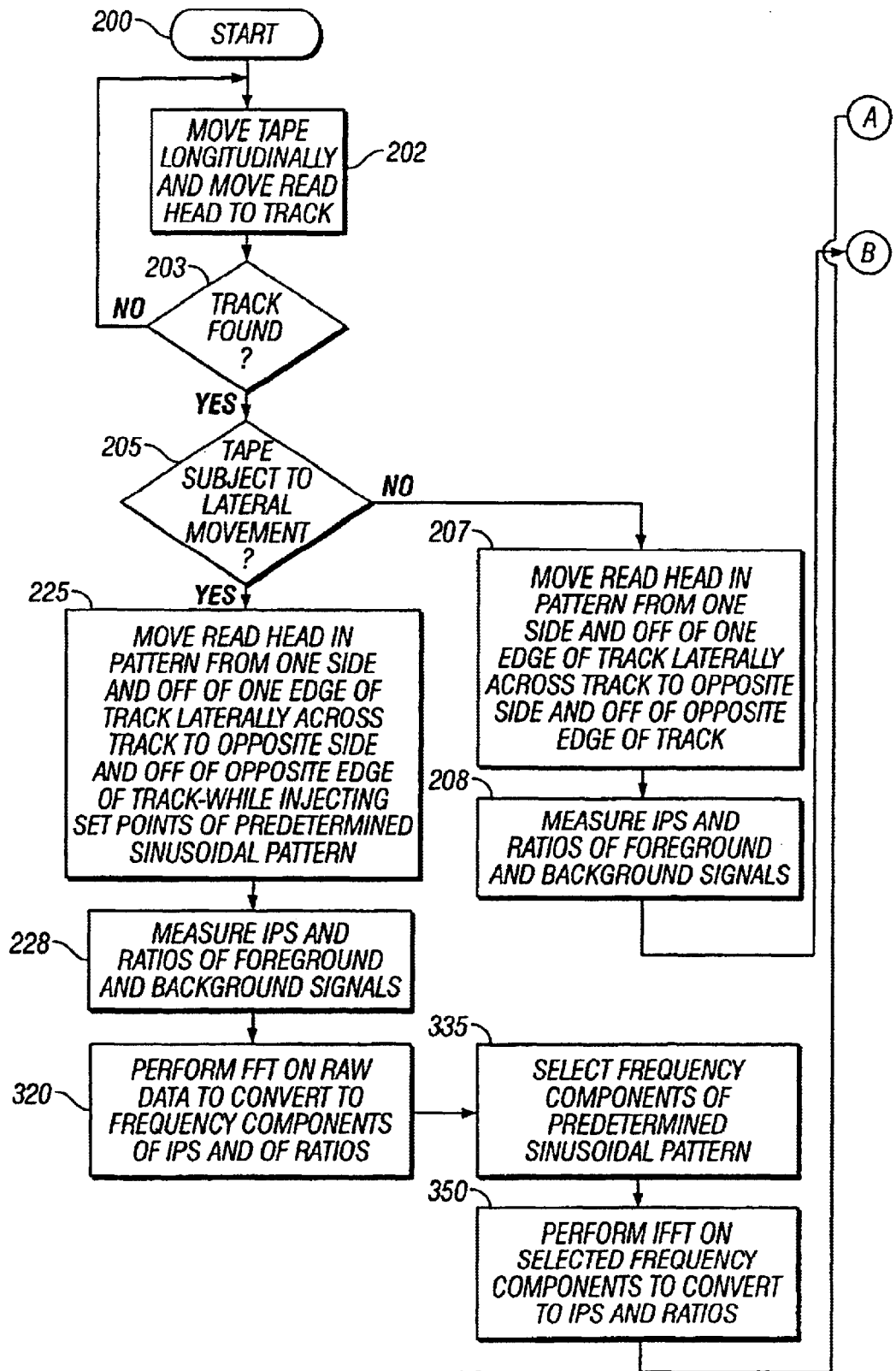
FIG. 3 is a flow chart depicting an embodiment of the method of the present invention.
Figure 3B:
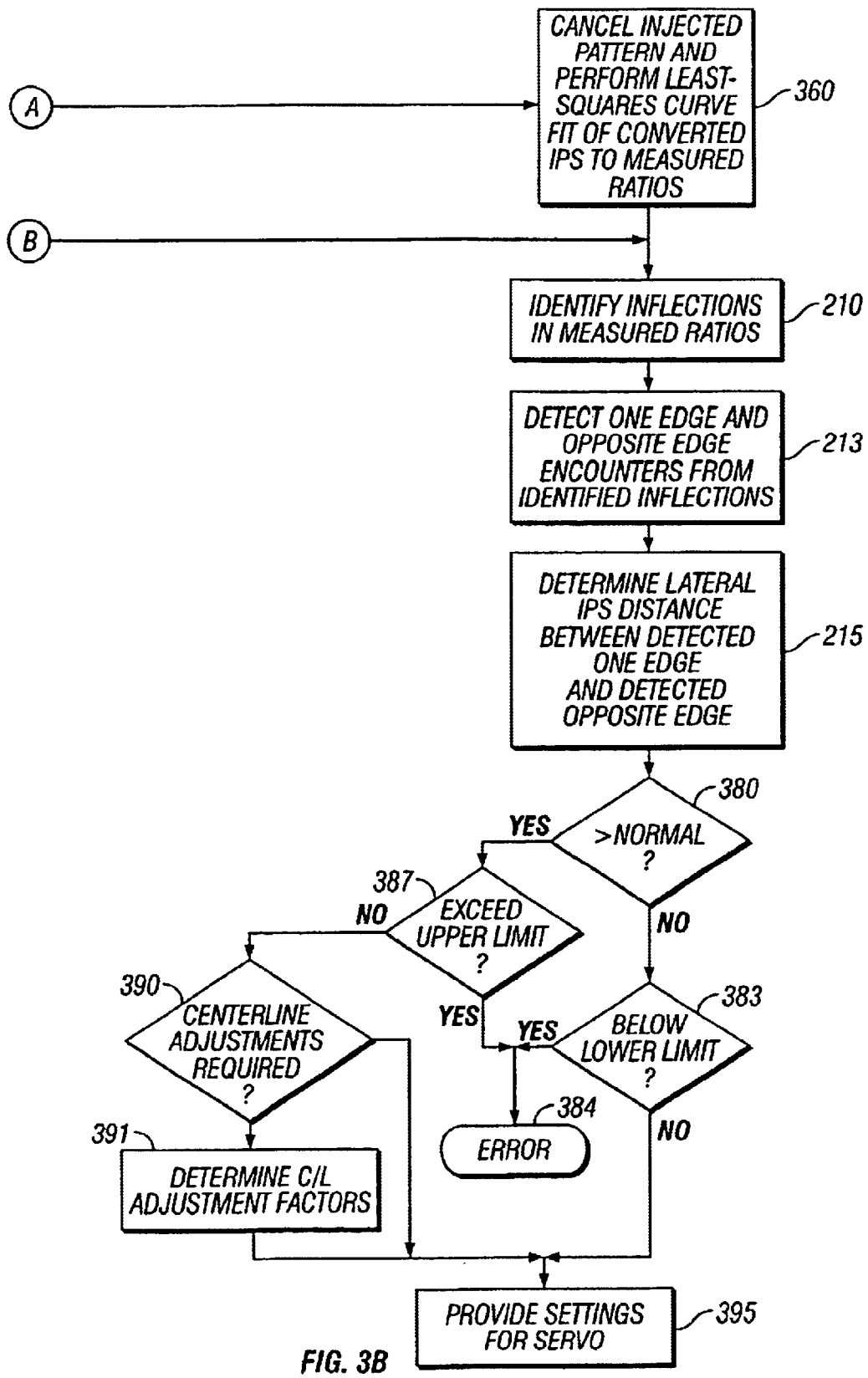

Embodiments of a method in accordance with the present invention is illustrated in FIG. 3, starting at step 200.

In step 202, the tape is moved longitudinally in the direction of arrow 105 of FIG. 2, and the magnetic tape read head 107 is moved to the vicinity of the track of the foreground magnetic track signal 100. For example, if a servo read element is the magnetic tape read head, the foreground magnetic track signal 100 is written at a lateral position closely adjacent a servo track. The servo read element is thus moved from the servo track toward the foreground magnetic track signal 100. Step 203 of FIG. 3 indicates whether the track is found, and, if not, the process cycles back to step 202 to continue to move towards the foreground magnetic track signal. As will be discussed, the tape may not be precisely guided, and a step 205 may be provided to determine if this is the case. If the tape is precisely guided, the process continues at step 207, at which the magnetic tape read head 107 of FIG. 2 is moved as discussed above, at least once entirely laterally to one side of and off of one edge of the foreground magnetic track signal 100, as shown by position 107, laterally across the foreground magnetic track signal, as shown by positions 110, 111, 112, 113, and entirely laterally to the opposite side of and off of the opposite edge of the foreground magnetic track signal 100, as shown by position 117. The pattern may be repeated several times as shown by dotted line 120.

As the magnetic tape read head is moved laterally in step 207 of FIG. 3, in step 208, the magnetic tape read head reads the dissimilar signals from the background signal 101 and the foreground signal 100 of FIG. 2, as shown by signal 131, and the independent position sensor detects lateral positions of the moving magnetic tape read head, as shown by signal 135. In step 210 of FIG. 3, the logic identifies the inflections in the foreground magnetic track signal, or in the ratio between the foreground magnetic track signal and the background signal, such as inflections 130, 133, 140, 146 of FIG. 2. In step 213 of FIG. 3, the logic employs the inflections of step 210 to detect the magnetic tape read head encountering the one edge and the opposite edge of the foreground magnetic track signal, as discussed above. In step 215, the logic matches the detected encounters of step 213 with the signal of the independent position sensor to determine the lateral distance between the detected one edge and detected opposite edge of the foreground magnetic track signal. The steps may be repeated many times to determine an average or mean value of the width of the foreground magnetic track signal. Further, adjustments may be made to reflect known corrections regarding the sensitivity of the magnetic tape read head, the independent position sensor, etc.

The described process is for a tape that is precisely guided. An additional process is conducted in accordance with another aspect of the present invention for a tape that is unguided, or is not precisely guided, and as is explained in detail in the incorporated U.S. patent application Ser. No. 10/035,182. In step 225 of FIG. 3, the magnetic tape read head 107 of FIG. 2 is moved as discussed above, at least once entirely laterally to one side of and off of one edge of the foreground magnetic track signal 100, as shown by position 107, laterally across the foreground magnetic track signal, as shown by positions 110, 111, 112, 113, and entirely laterally to the opposite side of and off of the opposite edge of the foreground magnetic track signal 100, as shown by position 117, and, in addition, the magnetic tape read head is moved in accordance with injected set points of a predetermined sinusoidal pattern. As is discussed in the incorporated U.S. patent application Ser. No. 10/035,182, the injection of the predetermined sinusoidal defined signal to a servo system provides a basis, in accordance with the present invention, to employ frequency filtering to separate out the actual independent position sensor lateral positions and the actual signals of the magnetic tape read head.

Figure 4:
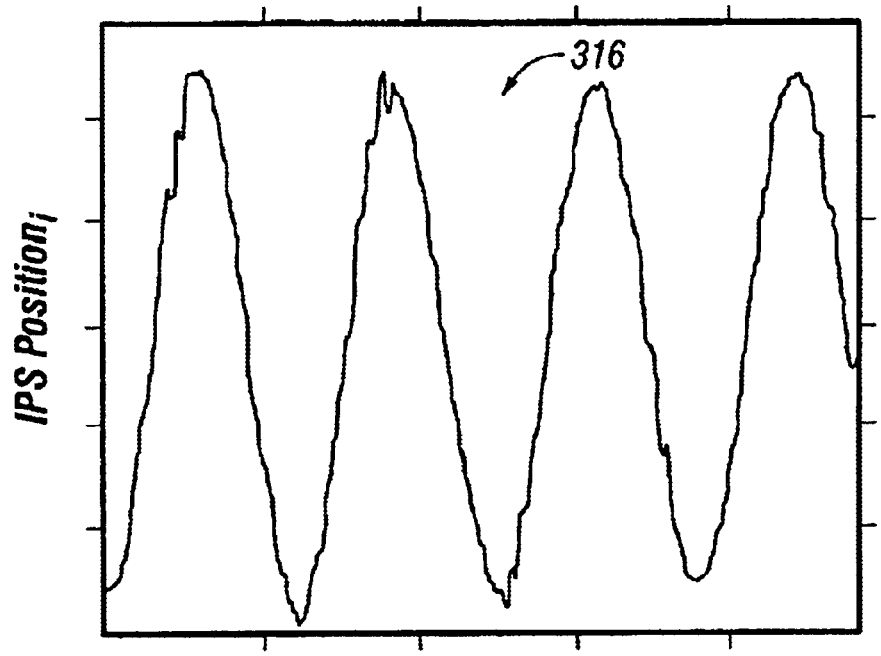
FIG. 4 is a diagrammatic representation of lateral positions of the independent position sensor of the magnetic tape system of FIG. 1, in which the magnetic tape is alternatively subject to lateral movement, and in which a predetermined sinusoidal single frequency pattern is added to the lateral movement of the read head.
Figure 5:
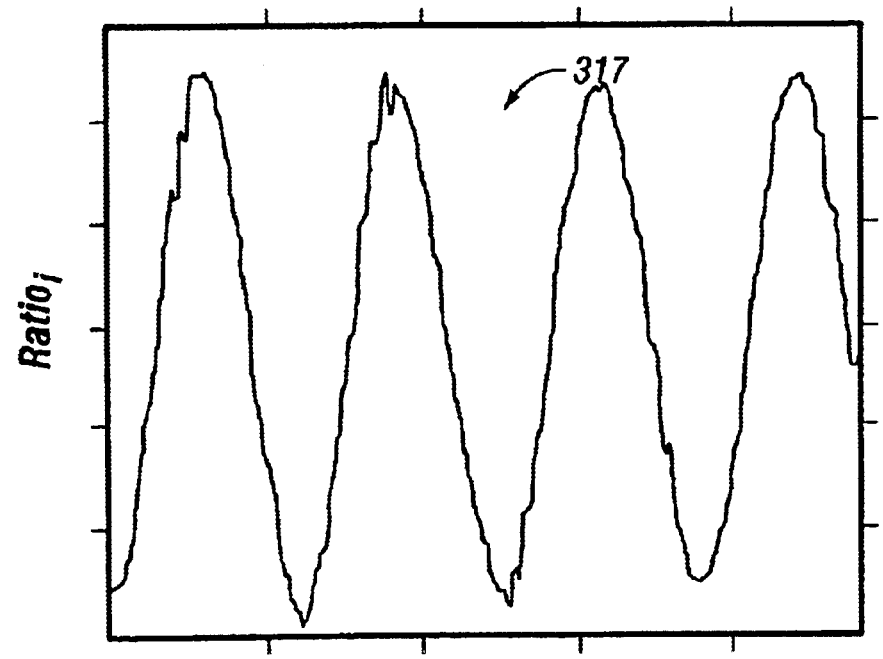
FIG. 5 is a diagrammatic representation of the ratios of the foreground signal to background signal detected by the read head of the magnetic tape system of FIG. 1, in which the magnetic tape is alternatively subject to lateral movement, and where the predetermined sinusoidal single frequency pattern is added to the lateral movement of the read head.

As the magnetic tape read head is moved laterally according to the combined pattern of step 225 of FIG. 3, in step 228, the magnetic tape read head reads the dissimilar signals from the background signal 101 and the foreground signal 100 of FIG. 2, and the independent position sensor detects lateral positions of the moving magnetic tape read head. FIG. 4 illustrates an example of a small portion of the unfiltered independent position sensor lateral position data. FIG. 5 illustrates an example of a small portion of the unfiltered ratio data of the magnetic tape read head.

The signals are now dominated by the sinusoidal pattern and not by the tape movement. The frequency of the sinusoidal pattern is known precisely, and anything that is not at the frequency of the sinusoidal pattern, or its harmonics, is noise in the measurement.

In one implementation of the incorporated U.S. patent application Ser. No. 10/035,182, the magnetic tape read head detector, which may comprise servo detector 28 in FIG. 1, provides digitally detected ratios (PES) of the magnetic tape read head at a predetermined sample rate. Further, the logic digitally determines, from the independent position sensor 460 of FIG. 1, at the sample rate of the track following servo system, the lateral positions of the magnetic tape read head with respect to the magnetic tape.

In step 320 of FIG. 3, the logic converts the digitally determined independent position sensor lateral positions to frequency components; and converts the digitally determined ratios of the detected track signals to frequency components. In one example, the servo logic converts the digitally determined independent position sensor lateral positions to frequency components by conducting fast Fourier transforms (FFT) of the digitally determined independent position sensor lateral positions; and converts the digitally determined ratios of servo signals to frequency components by conducting fast Fourier transforms (FFT) of the digitally determined ratios.

The FFT of each of the signals is performed to get the signals into the frequency domain where the noise can be removed.

Figure 6:
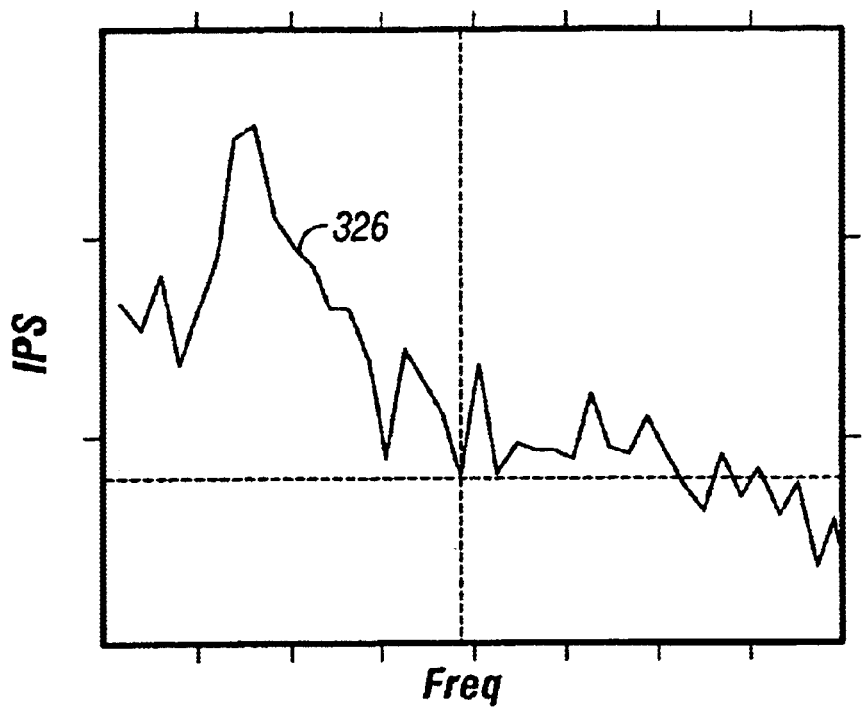
FIG. 6 is a diagrammatic representation of the frequency domain of the lateral positions of the independent position sensor of FIG. 4.
Figure 7:
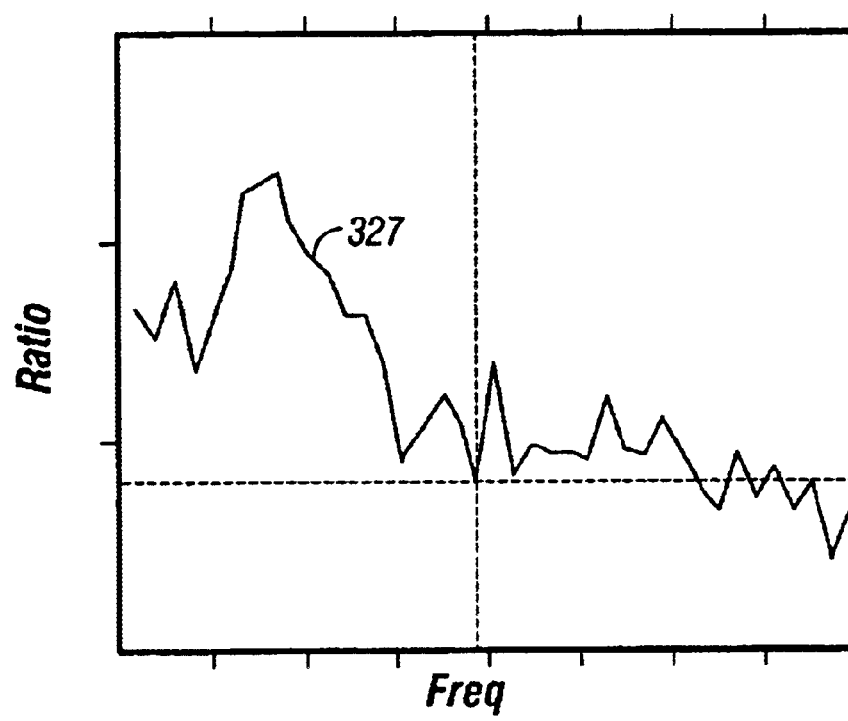
FIG. 7 is a diagrammatic representation of the frequency domain of the ratios of the foreground signal to background signal of FIG. 5.

FIG. 6 illustrates a waveform 326 representing the frequency domain of the digitally determined lateral positions of the independent position sensor from FIG. 4; and FIG. 7 illustrates a waveform 327 representing the frequency domain of the digitally determined ratio of the track signals sensed by the magnetic tape read head from FIG. 5.

In step 335 of FIG. 3, the logic selects from the frequency components of the independent position sensor lateral positions, and from the frequency components of the ratios of the servo signals, the predetermined sinusoidal pattern single frequency and at least one harmonic thereof, to thereby zero the noise. In one embodiment, there is insubstantial useful information beyond the fourth harmonic. Hence, in step 335, all of the frequency points are set to zero except for the single frequency of the injected sinusoidal pattern and up to four lowest frequency harmonics.

Thus, the process has gone from a situation in which the tape guiding noise is dominant, to one where the signal of interest is a sinusoidal pattern at a known single frequency. In the frequency domain, the noise is filtered out.

Figure 8:
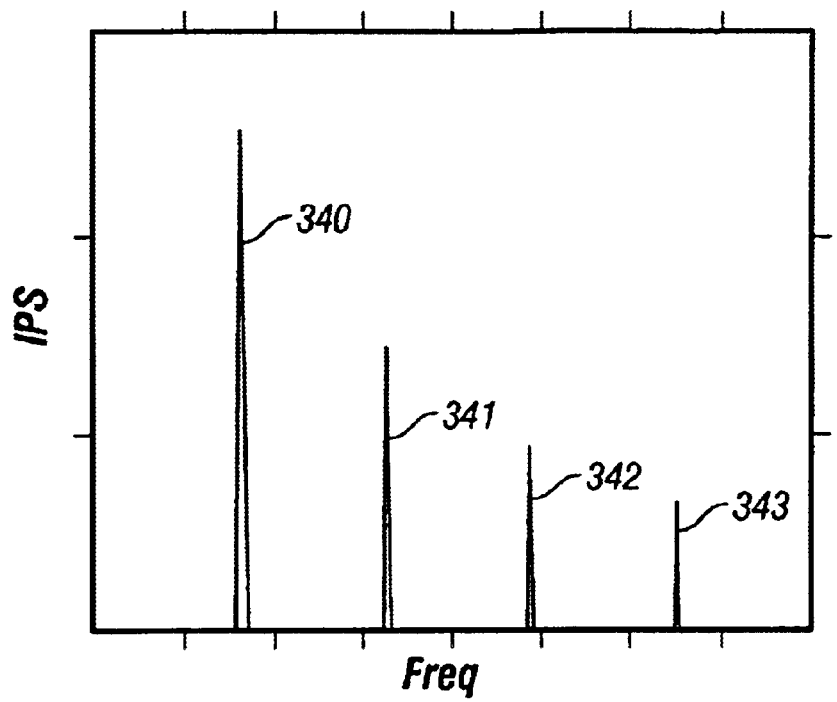
FIG. 8 is a diagrammatic representation of the independent position sensor lateral positions of FIG. 6, converted to frequency components from which the predetermined sinusoidal single frequency pattern has been selected.
Figure 9:
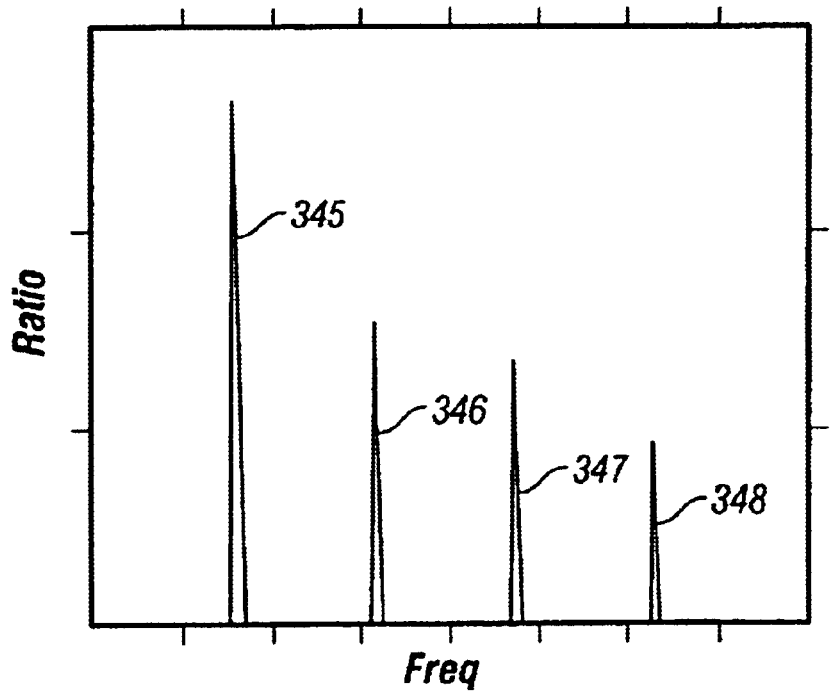
FIG. 9 is a diagrammatic representation of the ratios of the foreground signal to background signal of FIG. 7, converted to frequency components from which the predetermined sinusoidal single frequency pattern has been selected.

As examples, FIG. 8 illustrates waveforms representing the digitally determined independent position sensor lateral positions of FIG. 6, converted to frequency components from which the predetermined sinusoidal pattern single frequency 340 and harmonics 341, 342 and 343 have been selected. FIG. 9 illustrates waveforms representing the digitally determined ratios of the track signals of FIG. 7, converted to frequency components from which the predetermined sinusoidal pattern single frequency 345 and harmonics 346, 347 and 348 have been selected.

In step 350 of FIG. 3, the logic converts the selected frequency components to independent position sensor lateral positions, and converts the selected frequency components to ratios of the track signals. In one example, the logic converts the selected frequency components to independent position sensor lateral positions and the selected frequency components to ratios of track signals, both by conducting inverse fast Fourier transforms (IFFT) of the selected frequency components.

The conversion provides the signals to send to a curve fitting routine to generate coefficients for producing the track signals from the ratios and for producing the position signals from the independent position sensor.

Figure 10:
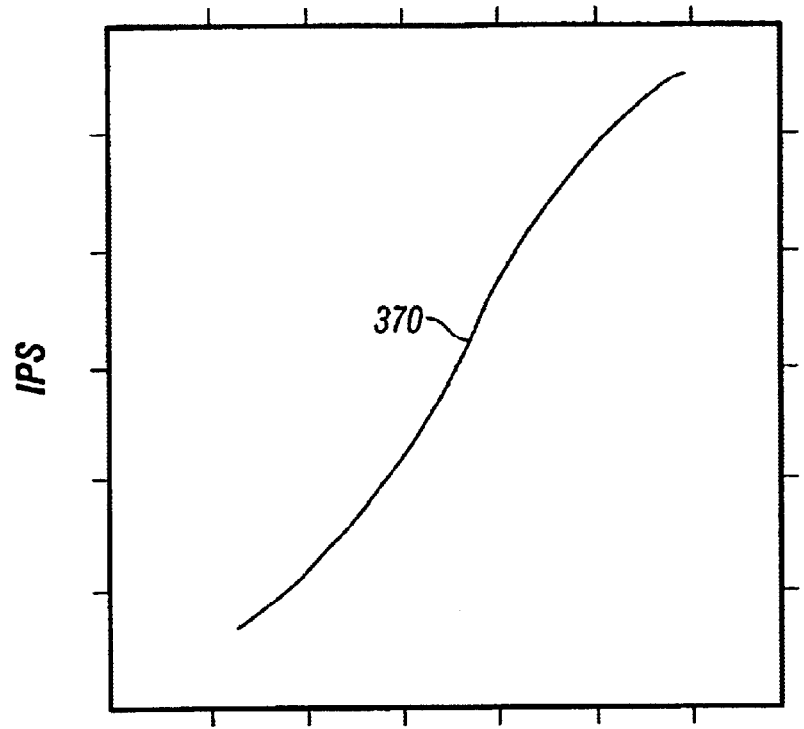
FIG. 10 is a diagrammatic representation of curve fitted converted independent position sensor lateral positions, which have been converted from the selected frequency components of FIG. 8.
Figure 11:
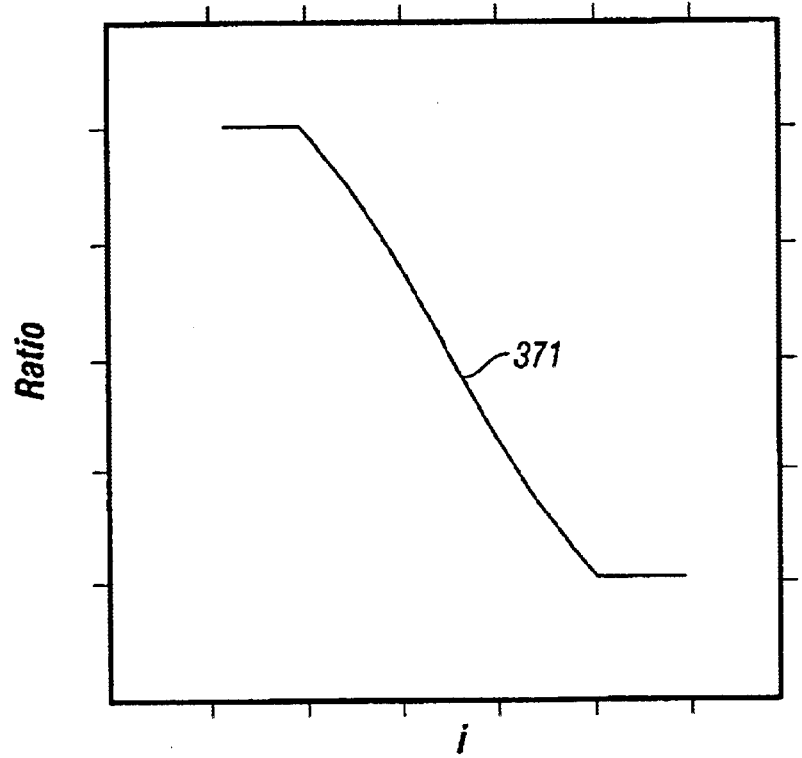
FIG. 11 is a diagrammatic representation of curve fitted converted ratios of the foreground signal to background signal, which have been converted from the selected frequency components of FIG. 10.

Step 350 moves, via connectors 351, 352 to step 360 of FIG. 3. In step 360, the logic cancels the injected sinusoid pattern of the converted independent position sensor waveform and of the converted ratios of the track signals of step 350, and the servo logic fits a curve to the converted independent position sensor lateral positions of the selected frequency components and of the converted ratios of the track signals to provide "cleaned up data" of the independent position sensor, such as illustrated by curve 370 in FIG. 10, and to provide "cleaned up data" of the track signals, such as illustrated by curve 371 in FIG. 11.

The curve fitting may comprise a second order curve fitting algorithm for individually fitting the independent position sensor signals and track signals to a curve.

Briefly, the logic curve fits two dimensional, second order curve to the ratios and to the independent position sensor lateral positions, for example, with a standard curve fit routine, such as a quadratic equation. Also, characteristics of the magnetic tape read head or the independent position sensor may result in offsets from the fitted curve. Hence, least squares adjustments, employing a standard algorithm, may also conducted of the quadratic equation second order curve to smooth the curve. Alternative curve fitting methodologies may be employed to fit each respective curve.

The resultant independent position sensor lateral position data and detected track signal data are then employed in the process of steps 210, 213, and 215 to determine the lateral distance between the detected one edge and detected opposite edge of the foreground magnetic tape signal 100 of FIG. 2.

The tracks to be written by a write gap of a magnetic head are of a nominal width having a nominal centerline, and the above process determines the actual effective width of the write gap by means of measuring the width of the foreground magnetic track signal.

In another aspect of the present invention, the process also determines whether the write gap is too small to be effective, whether it is too large to be effective, and whether the centerlines of the resultant tracks will have to be adjusted for reading the written tracks.

In step 380, in one embodiment of the process, the logic determines whether the determined lateral distance of step 215 for the write gap being measured is greater than the nominal width of the tracks. If not, step 383 determines whether the determined lateral distance of step 215 is below a lower limit. For example, the write gaps may be too narrow, in that the written tracks are too narrow to read without noise. Thus, if the lateral distance is below the lower limit of step 383, an error is signaled in step 384. As the result, the head 20 of FIG. 1 may have to be replaced.

If the determined lateral distance of step 380 of FIG. 3 for the write gap being measured is greater than the nominal width of the tracks, step 387 determines whether the determined lateral distance of step 215 exceeds an upper limit. For example, the write gaps may be too wide, and may result in written tracks that overwrite too much of the adjacent track. Thus, if the lateral distance exceeds the upper limit of step 387, an error is signaled in step 384. As the result, the head 20 of FIG. 1 may have to be replaced.

If the lateral distance is greater than nominal without exceeding the upper limit of step 387 of FIG. 3, the write gap may still be wide enough to cause "shingling" of the adjacent track. This is illustrated by reference to FIGS. 12A and 12B.

Figure 12A:
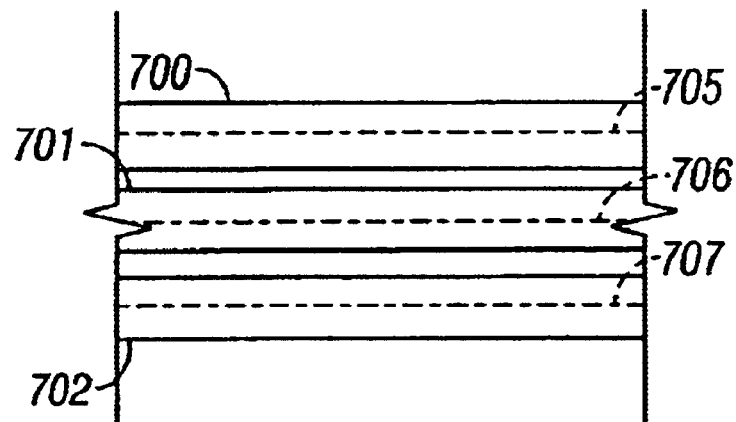
FIGS. 12A and 12B are diagrammatic illustrations of magnetic tracks of different widths written to a magnetic tape.
Figure 12B:
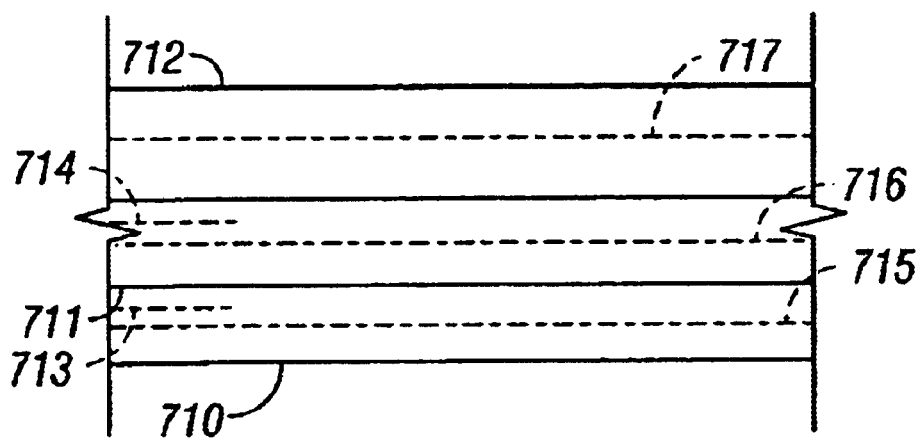

In FIG. 12A, adjacent tracks 700, 701, 702 are illustrated at a nominal size with gaps between the tracks. As the result, the read centerlines 705, 706, 707 are at the actual centerlines of the tracks as written. In FIG. 12B, the tracks are of larger than nominal width, and so wide that "shingling" occurs. The illustration of FIG. 12B may be exaggerated somewhat for the purpose of illustration.

The "shingling" is in a direction opposite to that of the order that the tracks are written. For example, the adjacent tracks 710, 711, 712 are written in the order of bottom to top, with track 712 written last. Thus, track 711 overlaps track 710 slightly, and track 712 overlaps track 711 slightly. Centerlines 713 and 714 represent the original or write centerlines of the tracks, respectively. As the result of track 711 overwriting part of track 710, the read centerline of track 710 becomes centerline 715. Similarly, as the result of track 712 overwriting part of track 711, the read centerline of track 711 becomes centerline 716. Centerline 717 of track 712 is unchanged since it is the last track written among the tracks adjacent to it. As a further example, if track 711 is rewritten on centerline 714, the read centerline of track 712 will be moved from centerline 717 to a position away from track 711. In all examples, the centerlines are, on average at a nominal separation, which is determined by the servo system, as is known to those of skill in the art.

If step 380 and step 387 of FIG. 3 determine that the determined lateral distance of step 215 is greater than nominal, but not in error, the logic, in step 390 determines whether shingling will occur. If so, step 391 determines from the determined lateral distance, the factors to apply to adjust the centerlines, and the process proceeds to step 395, providing a setting for the servo system for controlling the centerlines of a magnetic tape drive which will write magnetic tracks at the width of the foreground magnetic track signal to accommodate shingling between the magnetic tracks. If step 390 determines that centerline adjustments are not required, or if step 383 determines that the determined lateral distance of step 215 is nominal or less and is above the lower limit, the process proceeds to step 395, providing the servo system setting for controlling the centerlines of the magnetic tape drive at the nominal distance.

As discussed above, the write gaps (read gaps also) tend to vary slightly in width between tape heads, and, due to various edge or fringing effects, the write gaps tend to have effective widths that vary between tape heads. However, in many cases, the effective widths are about the same within a tape head, even though there may be variation between tape heads. Hence, measurements may be made of one write gap, or, as an assurance, to more than one write gap, and the settings of step 395 will apply to all write gaps of the head 20 of FIG. 1.

Figure 13:
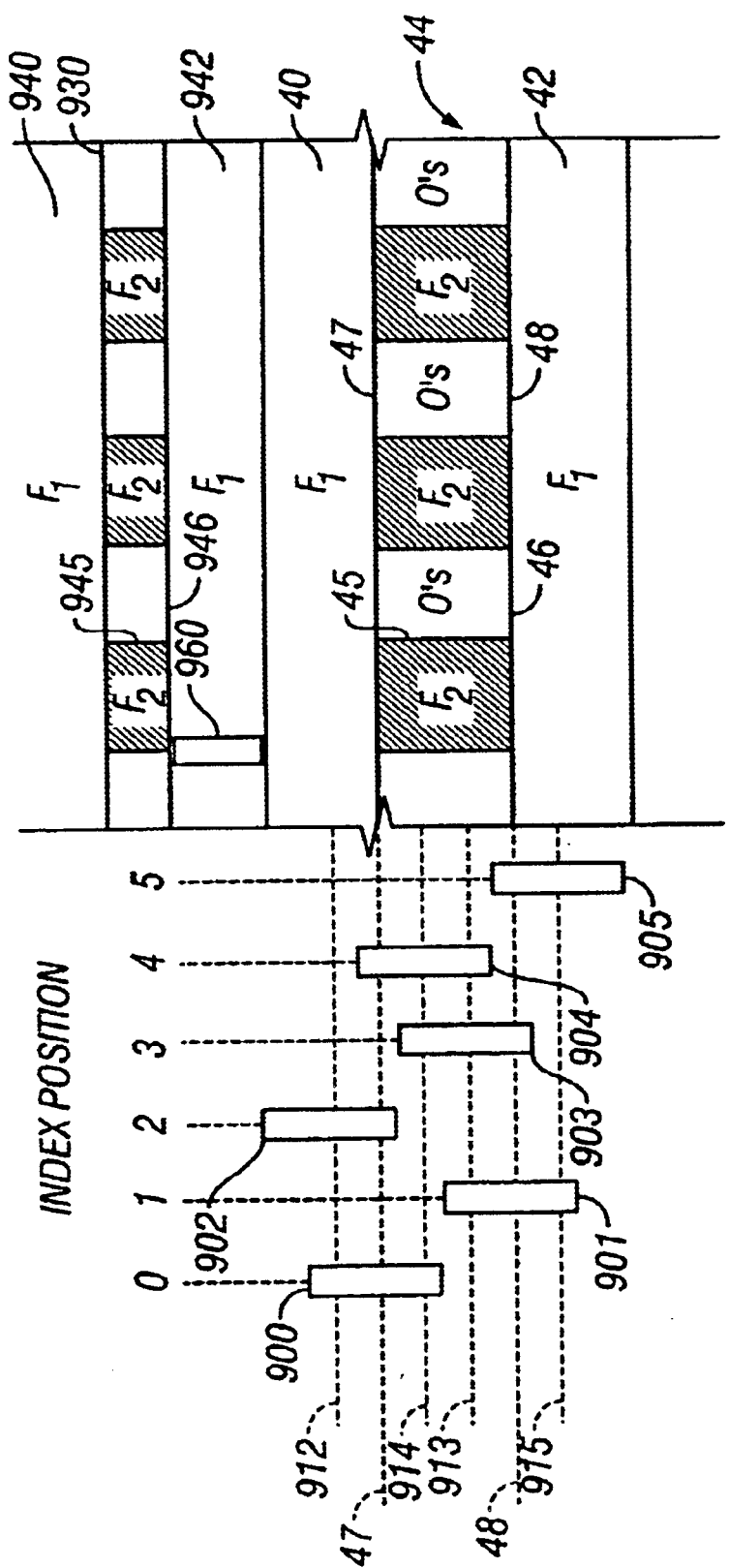
FIG. 13 is a diagrammatic representation of an embodiment of a servo head of the magnetic tape system of FIG. 1 at various index positions and employed to move laterally with respect to a track signal as represented in FIG. 2.

FIG. 13 illustrates an example of a servo system, and of the signals that may be employed for the foreground magnetic track signal and background signal. In the exemplary servo system, the servo detector follows linear servo edges 47 and 48 comprising an interface between two dissimilar recorded servo signals. One set of servo edges comprises outer bands 40 and 42, having a recorded pattern of a constant amplitude signal of a single first frequency, on either side of an inner band 44 of the other servo signal, having a recorded pattern alternating between a constant amplitude burst signal 45 of a single second frequency and a zero amplitude null signal 46.

To increase data track density, servo index positions 912, 913, 914 and 915 are provided which are laterally offset with respect to the sensed servo edges of the set of linear servo edges, providing six possible index positions. For example, the servo read element may be located at position 900 centered on servo edge 47 or at position 901 centered on servo edge 48. The additional index positions are aligned such that a servo read element is displaced from an edge 47 or 48 located along lines 912–915 about ⅓ the width of the middle track 44 away from the servo edge 47 or 48 in either direction.

In one embodiment of the present invention, the same servo system may be employed to determine the width of a foreground magnetic track signal 930. The background signal 940, 942, is written as a constant amplitude signal of a single first frequency. The foreground magnetic track signal 930 is written as a pattern alternating between a constant amplitude burst signal 945 of a single second frequency and a zero amplitude null signal 946. The first frequency and second frequency of the background signal 940, 942, and the foreground magnetic track signal 930, respectively, may be identical to the first and second frequencies of the servo system. The servo read element ay also be used as the magnetic tape read head, as shown by servo read element 960.

Alternatively, the background signal 940, 942, and the foreground magnetic track signal 930 may comprise signals of different, separately discernible, frequencies or rates or digital combinations.

Still alternatively, the magnetic tape read head may comprise a standard read head of the tape head 20 of FIG. 1.

While the preferred embodiments of the present invention have been illustrated in detail, it should be apparent that modifications and adaptations to those embodiments may occur to one skilled in the art without departing from the scope of the present invention as set forth in the following claims.

We claim:

1. A system for determining the width of a foreground magnetic track signal written longitudinally on a magnetic tape having a background signal, said foreground magnetic track signal comprising a signal dissimilar to said background signal, comprising:

a magnetic tape read head;

a servo system for moving a magnetic tape read head laterally with respect to said longitudinally written foreground magnetic track signal as said magnetic tape is moved longitudinally with respect to said magnetic tape read head, such that said magnetic tape read head may read said foreground magnetic track signal and may read said background signal; said lateral movement such that said magnetic tape read head is moved at least once entirely laterally to one side of and off of one edge of said foreground magnetic track signal, laterally across said foreground magnetic track signal, and entirely laterally to the opposite side of and off of the opposite edge of said foreground magnetic track signal; whereby said magnetic tape read head reads said dissimilar signals;

an independent position sensor for detecting lateral positions of said moving magnetic tape read head; and logic for receiving detected signals from said magnetic read head, and from said independent position sensor, said logic:
- detecting said magnetic read head encountering said one edge of said foreground magnetic track signal;
- determining, from said independent position sensor, said lateral position of said moving magnetic tape read head at said detected one edge of said foreground magnetic track signal;
- detecting said magnetic tape read head encountering said opposite edge of said foreground magnetic track signal;
- determining, from said independent position sensor, said lateral position of said moving magnetic tape read head at said detected opposite edge of said foreground magnetic track signal; and
- determining lateral distance between said determined lateral position of said moving magnetic tape read head at said detected one edge of said foreground magnetic track signal, and said determined lateral position of said moving magnetic tape read head at said detected opposite edge of said foreground magnetic track signal.

2. The system of claim 1, wherein said logic, in detecting said magnetic tape read head encountering said one edge of said foreground magnetic track signal, and encountering said opposite edge of said foreground magnetic track signal, each comprises measuring a ratio between said foreground magnetic track signal and said background signal, and wherein said ratios when said magnetic tape read head is moved entirely laterally to said one side of and off of said one edge of said foreground magnetic track signal, and moved entirely laterally to said opposite side of and off of said opposite edge of said foreground magnetic track signal, each indicates a minimum value of said foreground magnetic track signal.

3. The system of claim 2, wherein said logic, in detecting said magnetic tape read head encountering said one edge of said foreground magnetic track signal, and encountering said opposite edge of said foreground magnetic track signal, additionally each comprises detecting an inflection in said measured ratio between said foreground magnetic track signal and said background signal.

4. The system of claim 3, wherein said servo system moves said magnetic tape read head laterally with respect to said longitudinally written foreground magnetic track signal, additionally operating at set points which are altered at a predetermined sinusoidal single frequency pattern, said pattern such that said magnetic tape read head is moved at least once entirely laterally to one side of and off of one edge of said foreground magnetic track signal, laterally across said foreground magnetic track signal, and entirely laterally to the opposite side of and off of the opposite edge of said foreground magnetic track signal; and
said logic additionally:
- converts digitally determined said lateral positions detected by said independent position sensor to frequency components;
- selects from said frequency components of said lateral positions, said predetermined sinusoidal single frequency pattern;
- converts said lateral position frequency components to independent position sensor lateral positions;
- measures digitally determined ratios between said foreground magnetic track signal and said background signal from said magnetic tape read head;
- converts said digitally determined ratios to frequency components;
- selects from said frequency components of said ratios, said predetermined sinusoidal single frequency pattern;
- converts said ratio frequency components to ratios of said foreground magnetic track signal and said background signal; and
- cancels said predetermined sinusoidal single frequency pattern and fits a curve to said converted independent position sensor lateral positions and to said converted ratios of said foreground magnetic track signal and said background signal.

5. The system of claim 1, wherein said magnetic tape read head comprises a servo read head of said servo system, and said magnetic tape additionally comprises at least one servo track parallel to and laterally offset from said foreground magnetic track signal, and said servo system additionally moves said magnetic tape read head laterally from said at least one servo track to said foreground magnetic track signal, as measured by said independent position sensor.

6. The system of claim 1, wherein said magnetic tape read head is wider than the width of said foreground magnetic track signal, such that said background signal may be read by said magnetic tape read head during each stage of laterally moving said magnetic tape read head, entirely laterally to said one side of and off of said one edge of said foreground magnetic track signal, laterally across said foreground magnetic track signal, and entirely laterally to said opposite side of and off of said opposite edge of said foreground magnetic track signal.

7. The system of claim 1, wherein said logic additionally:
- determines from said determined lateral distance, whether said determined lateral distance is greater than a nominal distance between centerlines of magnetic track signals; and
- if so, provides a setting for said servo system for controlling said centerlines of a magnetic tape drive which will write magnetic tracks at said width of said foreground magnetic track signal to accommodate shingling between said magnetic tracks at said width;
- else, provides said servo system setting for controlling said centerlines of said magnetic tape drive at said nominal distance.

8. A computer program product usable with a programmable computer having computer readable program code embodied therein, for determining the width of a foreground magnetic track signal written longitudinally on a magnetic tape having a background signal, said foreground magnetic track signal comprising a signal dissimilar to said background signal; said computer program product comprising:
computer readable program code which causes a computer processor to move a magnetic tape read head laterally with respect to said longitudinally written foreground magnetic track signal as said magnetic tape is moved longitudinally with respect to said magnetic tape read head, such that said magnetic tape read head may read said foreground magnetic track signal and may read said background signal; said lateral movement such that said magnetic tape read head is moved at least once entirely laterally to one side of and off of one edge of said foreground magnetic track signal, laterally across said foreground magnetic track signal, and entirely laterally to the opposite side of and off of the opposite edge of said foreground magnetic track signal; whereby said magnetic tape read head reads said dissimilar signals; and wherein an independent position sensor detects lateral positions of said moving magnetic tape read head;

computer readable program code which causes a computer processor to detect said magnetic read head encountering said one edge of said foreground magnetic track signal;

computer readable program code which causes a computer processor to determine, from said independent position sensor, said lateral position of said moving magnetic tape read head at said detected one edge of said foreground magnetic track signal;

computer readable program code which causes a computer processor to detect said magnetic tape read head encountering said opposite edge of said foreground magnetic track signal;

computer readable program code which causes a computer processor to determine, from said independent position sensor, said lateral position of said moving magnetic tape read head at said detected opposite edge of said foreground magnetic track signal; and computer readable program code which causes a computer processor to determine lateral distance between said determined lateral position of said moving magnetic tape read head at said detected one edge of said foreground magnetic track signal, and said determined lateral position of said moving magnetic tape read head at said detected opposite edge of said foreground magnetic track signal.

9. The computer program product of claim 8, wherein said computer readable program code which causes a computer processor to detect said magnetic tape read head encountering said one edge of said foreground magnetic track signal, and said computer readable program code which causes a computer processor to detect said magnetic tape read head encountering said opposite edge of said foreground magnetic track signal, each comprises computer readable program code which causes a computer processor to measure a ratio between said foreground magnetic track signal and said background signal, and wherein said ratios when said magnetic tape read head is moved entirely laterally to said one side of and off of said one edge of said foreground magnetic track signal, and moved entirely laterally to said opposite side of and off of said opposite edge of said foreground magnetic track signal, each indicates a minimum value of said foreground magnetic track signal.

10. The computer program product of claim 9, wherein said computer readable program code which causes a computer processor to detect said magnetic tape read head encountering said one edge of said foreground magnetic track signal, and said computer readable program code which causes a computer processor to detect said magnetic tape read head encountering said opposite edge of said foreground magnetic track signal, additionally each comprises computer readable program code which causes a computer processor to detect an inflection in said measured ratio between said foreground magnetic track signal and said background signal.

11. The computer program product of claim 10, wherein said computer readable program code which causes a computer processor to move a magnetic tape read head laterally with respect to said longitudinally written foreground magnetic track signal, additionally comprises:

computer readable program code which causes a computer processor to move said magnetic tape read head laterally at set points which are altered at a predetermined sinusoidal single frequency pattern, said pattern such that said magnetic tape read head is moved at least once entirely laterally to one side of and off of one edge of said foreground magnetic track signal, laterally across said foreground magnetic track signal, and entirely laterally to the opposite side of and off of the opposite edge of said foreground magnetic track signal; and said computer readable program code which causes a computer processor to determine, from said independent position sensor, said lateral positions of said moving magnetic tape read head at said detected one edge of said foreground magnetic track signal, and at said detected opposite edge of said foreground magnetic track signal, additionally comprises:

computer readable program code which causes a computer processor to convert digitally determined said lateral positions to frequency components;

computer readable program code which causes a computer processor to select from said frequency components of said lateral positions, said predetermined sinusoidal single frequency pattern;

computer readable program code which causes a computer processor to convert said lateral position frequency components to independent position sensor lateral positions;

computer readable program code which causes a computer processor to measure digitally determined ratios between said foreground magnetic track signal and said background signal from said magnetic tape read head;

computer readable program code which causes a computer processor to convert said digitally determined ratios to frequency components;

computer readable program code which causes a computer processor to select from said frequency components of said ratios, said predetermined sinusoidal single frequency pattern;

computer readable program code which causes a computer processor to convert said ratio frequency components to ratios of said foreground magnetic track signal and said background signal; and computer readable program code which causes a computer processor to cancel said predetermined sinusoidal single frequency pattern and fit a curve to said converted independent position sensor lateral positions and to said converted ratios of said foreground magnetic track signal and said background signal.

12. The computer program product of claim 8, wherein said magnetic tape read head comprises a servo read head, and said magnetic tape additionally comprises at least one servo track parallel to and laterally offset from said foreground magnetic track signal, and wherein said computer readable program code which causes a computer processor to move a magnetic tape read head laterally with respect to said longitudinally written foreground magnetic track signal additionally comprises moving said servo read head from said at least one servo track to said foreground magnetic track signal, as measured by said independent position sensor.

13. The computer program product of claim 8, additionally comprising:

computer readable program code which causes a computer processor to determine from said determined lateral distance, whether said determined lateral distance is greater than a nominal distance between centerlines of magnetic track signals; computer readable program code which causes a computer processor to, if so, provide a setting for a servo system for controlling said centerlines of a magnetic tape drive which will write magnetic tracks at said width of said foreground magnetic track signal to accommodate shingling between said magnetic tracks at said width; and computer readable program code which causes a computer processor to, else, provide said servo system setting for controlling said centerlines of said magnetic tape drive at said nominal distance.

14. A method for determining the width of a foreground magnetic track signal written longitudinally on a magnetic tape having a background signal, said foreground magnetic track signal comprising a signal dissimilar to said background signal, comprising the steps of:

moving a magnetic tape read head laterally with respect to said longitudinally written foreground magnetic track signal as said magnetic tape is moved longitudinally with respect to said magnetic tape read head, such that said magnetic tape read head may read said foreground magnetic track signal and may read said background signal; said lateral movement such that said magnetic tape read head is moved at least once entirely laterally to one side of and off of one edge of said foreground magnetic track signal, laterally across said foreground magnetic track signal, and entirely laterally to the opposite side of and off of the opposite edge of said foreground magnetic track signal; whereby said magnetic tape read head reads said dissimilar signals;

detecting, via an independent position sensor, lateral positions of said moving magnetic tape read head;

detecting said magnetic read head encountering said one edge of said foreground magnetic track signal;

determining, from said independent position sensor, said lateral position of said moving magnetic tape read head at said detected one edge of said foreground magnetic track signal;

detecting said magnetic tape read head encountering said opposite edge of said foreground magnetic track signal;

determining, from said independent position sensor, said lateral position of said moving magnetic tape read head at said detected opposite edge of said foreground magnetic track signal; and determining lateral distance between said determined lateral position of said moving magnetic tape read head at said detected one edge of said foreground magnetic track signal, and said determined lateral position of said moving magnetic tape read head at said detected opposite edge of said foreground magnetic track signal.

15. The method of claim 14, wherein said steps of detecting said magnetic tape read head encountering said one edge of said foreground magnetic track signal, and encountering said opposite edge of said foreground magnetic track signal, each comprises measuring a ratio between said foreground magnetic track signal and said background signal, and wherein said ratios when said magnetic tape read head is moved entirely laterally to said one side of and off of said one edge of said foreground magnetic track signal, and moved entirely laterally to said opposite side of and off of said opposite edge of said foreground magnetic track signal, each indicates a minimum value of said foreground magnetic track signal.

16. The method of claim 15, wherein said steps of detecting said magnetic tape read head encountering said one edge of said foreground magnetic track signal, and encountering said opposite edge of said foreground magnetic track signal, additionally each comprises detecting an inflection in said measured ratio between said foreground magnetic track signal and said background signal.

17. The method of claim 16, wherein said step of moving a magnetic tape read head laterally with respect to said longitudinally written foreground magnetic track signal, additionally comprises:

operating a servo system at set points which are altered at a predetermined sinusoidal single frequency pattern, said pattern such that said magnetic tape read head is moved at least once entirely laterally to one side of and off of one edge of said foreground magnetic track signal, laterally across said foreground magnetic track signal, and entirely laterally to the opposite side of and off of the opposite edge of said foreground magnetic track signal; and said step of detecting, via said independent position sensor, lateral positions of said moving magnetic tape read head, additionally comprises:

digitally determining said lateral positions;

converting said digitally determined lateral positions to frequency components;

selecting from said frequency components of said lateral positions, said predetermined sinusoidal single frequency pattern;

converting said lateral position frequency components to independent position sensor lateral positions;

measuring digitally determined ratios between said foreground magnetic track signal and said background signal from said magnetic tape read head;

converting said digitally determined ratios to frequency components;

selecting from said frequency components of said ratios, said predetermined sinusoidal single frequency pattern;

converting said ratio frequency components to ratios of said foreground magnetic track signal and said background signal; and canceling said predetermined sinusoidal single frequency pattern and fitting a curve to said converted independent position sensor lateral positions and to said converted ratios of said foreground magnetic track signal and said background signal.

18. The method of claim 14, wherein said magnetic tape read head comprises a servo read head, and said magnetic tape additionally comprises at least one servo track parallel to and laterally offset from said foreground magnetic track signal, and said step of moving a magnetic tape read head laterally with respect to said longitudinally written foreground magnetic track signal additionally comprises moving said servo read head from said at least one servo track to said foreground magnetic track signal, as measured by said independent position sensor.

19. The method of claim 14, wherein said magnetic tape read head is wider than the width of said foreground magnetic track signal, such that said background signal may be read by said magnetic tape read head during each stage of said step of laterally moving said magnetic tape read head, entirely laterally to said one side of and off of said one edge of said foreground magnetic track signal, laterally across said foreground magnetic track signal, and entirely laterally to said opposite side of and off of said opposite edge of said foreground magnetic track signal.

20. The method of claim 14, additionally comprising the steps of:

determining from said determined lateral distance, whether said determined lateral distance is greater than a nominal distance between centerlines of magnetic track signals; and if so, providing a setting for a servo system for controlling said centerlines of a magnetic tape drive which will write magnetic tracks at said width of said foreground magnetic track signal to accommodate shingling between said magnetic tracks at said width;

else, providing said servo system setting for controlling said centerlines of said magnetic tape drive at said nominal distance.

* * * * *